(12) United States Patent
Schmidt et al.

(10) Patent No.: US 11,868,122 B2
(45) Date of Patent: Jan. 9, 2024

(54) DIGITAL TWIN OUTCOME-DRIVEN ORCHESTRATION

(71) Applicant: Rockwell Automation Technologies, Inc., Mayfield Heights, OH (US)

(72) Inventors: Robert Schmidt, Germantown, WI (US); Thong Nguyen, Milwaukee, WI (US); Paul Schmirler, Glendale, WI (US); Jingbo Liu, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/471,967

(22) Filed: Sep. 10, 2021

(65) Prior Publication Data

US 2023/0082099 A1  Mar. 16, 2023

(51) Int. Cl.
  *G05B 19/418*  (2006.01)
(52) U.S. Cl.
  CPC .  G05B 19/41885 (2013.01); G05B 19/41875 (2013.01); *G05B 2219/31001* (2013.01)
(58) Field of Classification Search
  CPC ........ G05B 19/41885; G05B 19/41875; G05B 2219/31001
  See application file for complete search history.

(56) References Cited

U.S. PATENT DOCUMENTS

| | | | | |
|---|---|---|---|---|
| 2020/0012263 A1* | 1/2020 | Ludwig | ............ | G05B 19/41875 |
| 2020/0201314 A1* | 6/2020 | Franke | .................... | G01W 1/10 |
| 2020/0402315 A1* | 12/2020 | Yerli | ........................ | G06F 9/453 |
| 2021/0133670 A1* | 5/2021 | Cella | ........................ | G06N 3/044 |
| 2022/0036302 A1* | 2/2022 | Cella | .................. | G06Q 10/0834 |

FOREIGN PATENT DOCUMENTS

EP    3819091 A1    5/2021

OTHER PUBLICATIONS

Extended European Search Report for EP App. No. 22193676.8, dated Feb. 3, 2023, European Patent Office 80298 Munich Germany; 14 pages.
Kontaxoglou, Anastasios, , et al., "Towards a Digital Twin Enabled Multi-Fidelity Framework for Small Satellites", Proceedings for the European Conference of the PHM Society 2021, ISBN: 978-1-936263-34-9, XP055936476, http://papers.phmsociety.org/index.php/phme/article/view/2801, 10 pages, Jun. 29, 2021, 211-220.

(Continued)

*Primary Examiner* — Chad G Erdman

(57) ABSTRACT

Various embodiments of the present technology relate to digital twins of devices and assemblies. More specifically, some embodiments relate to the orchestration of digital twin models for representing industrial systems based on characteristics of digital twins. In an embodiment, a method of operating an orchestration engine in an industrial automation environment comprises identifying a targeted outcome for modeling the industrial automation environment, configuring a digital twin environment corresponding to the industrial automation environment based at least on the targeted outcome, and executing a process associated with the industrial automation environment using the digital twin environment.

20 Claims, 11 Drawing Sheets

(56) References Cited

OTHER PUBLICATIONS

Chetan, Mayank, et al., "Multi-fidelity digital twin structural model for a sub-scale downwind wind turbine rotor plade", Wind Energy, vol. 24, mo. 12, XP093017622, GB, ISSN: 1095-4244, DOI: 10.1002/we.2636, https://doi.org/10.1002/we.2636, 20 pages, May 6, 2021, 1368-1387.

Franciosa, Pasquale, et al., "Deep learning enhanced digital twin for Closed-Loop In-Process quality improvement", CIRP Annals—Manufacturing Technology, Elsevier BV, NL, CH, FR., vol. 69, No. 1, XP086213029, ISSN:0007-8506, DOI: 10.1016/J.CIRP.2020.04. 110, 4 pages, Jun. 17, 2020, 369-372.

Gonzalez, Mikel, et al., "A Digital Twin for Operational Evaluation of Vertical Transportation System", IEEE Access, IEEE, USA, vol. 8, XP011796286, DOI: 10.1109/Access.2020.3001686, 12 pages, Jun. 11, 2020, 114389-114400.

Vanderhorn, Eric, et al., "Digital Twin: Generalization, characterization and implementation", Decision Support Systems, Elsevier, Amsterdam, NL, vol. 145, XP086535596, ISSN:0167-9236, DOI:10. 1016/J.DSS.2021.113524, 11 pages, Feb. 16, 2021.

\* cited by examiner

DIGITAL TWIN OUTCOME-DRIVEN ORCHESTRATION

TECHNICAL FIELD

Various embodiments of the present technology relate to digital twins of devices and assemblies, and more specifically, to the orchestration of digital twin models for simulating industrial systems based on characteristics of digital twins.

BACKGROUND

Industrial automation environments, such as factories, mills, and the like, comprise various devices, drives, machinery, and other components that function together to perform industrial processes. Traditionally, industrial systems and devices are monitored using sensors that can measure throughput and compile other data to understand predictive and preventative maintenance routines. As a result, overall system performance and condition can be determined.

With the rise of the Internet of Things, system operators have the ability to connect with and monitor performance of industrial automation environments at a deeper level to gain further insight at each step of a process. For instance, IoT can provide insight into energy consumption, production efficiency, device strain or deterioration, and various product and process data, as well as provide automation capabilities. One example made available by IoT to the industrial automation industry is digital twins (i.e., human-machine interface), or virtual representations of real entities. More specifically, a digital twin is a virtual representation of real-world entities and processes, synchronized at a specified frequency and fidelity. Digital twins can provide real-time data on the condition and performance of individual components, machine-to-machine variations, and entire lines of a factory, for example, by connecting to IoT entities. During each phase a machine lifecycle (i.e., design, build, operate, maintain, migrate, disposal), digital twins provide flexibility in allowing function and/or desired outcomes to vary.

Digital twins, however, are limited in customizability and require significant processing power and sensor data, among other things, to accurately model performance characteristics of industrial automation systems and devices and share data, bidirectionally, with its physical counterpart. Further, the ability to interface with and between various digital twins can be siloed making it difficult to implement in complex industrial environments. Thus, existing digital twins can only virtually replicate small scale devices and/or processes in limited ways. What is needed, rather, is a centralized digital twin platform capable of providing process-wide interfacing and customizable inputs/outputs to other digital twins based on system needs. Moreover, a repeatable process of configuring and using a digital twin platform is necessary to represent the multitude of outcomes achievable in both information technology and operational technology domains.

It is with respect to this general technical environment that aspects of the present technology disclosed herein have been contemplated. Furthermore, although a general environment has been discussed, it should be understood that the examples described herein should not be limited to the general environment identified in the background.

OVERVIEW

An orchestration engine for configuring digital twin models and simulating industrial systems based on characteristics of digital twins, and a method of operating the orchestration engine thereof, are provided herein. Digital twins can represent one or more real entities, such as a physical or perceived entity (i.e., a process), or systems in an industrial automation environment. Each digital twin can be configured with a fidelity to model a performance aspect of the one or more real entities or systems. Modeling systems using digital twins provides at least one or more benefits such as simulating or representing entity predictive outcomes in real-time, enhancing system efficiency and performance, reducing system maintenance costs and downtime, monitoring for errors, and training.

In an embodiment of the present technology, a method of operating an orchestration engine in an industrial automation environment comprises identifying a targeted outcome for modeling the industrial automation environment. The method further comprises configuring a digital twin environment corresponding to the industrial automation environment based at least on the targeted outcome, wherein the digital twin environment comprises one or more digital twins, each digital twin of the one or more digital twins representative of one or more real entities of the industrial automation environment. The method then comprises executing a process associated with the industrial automation environment using the digital twin environment.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
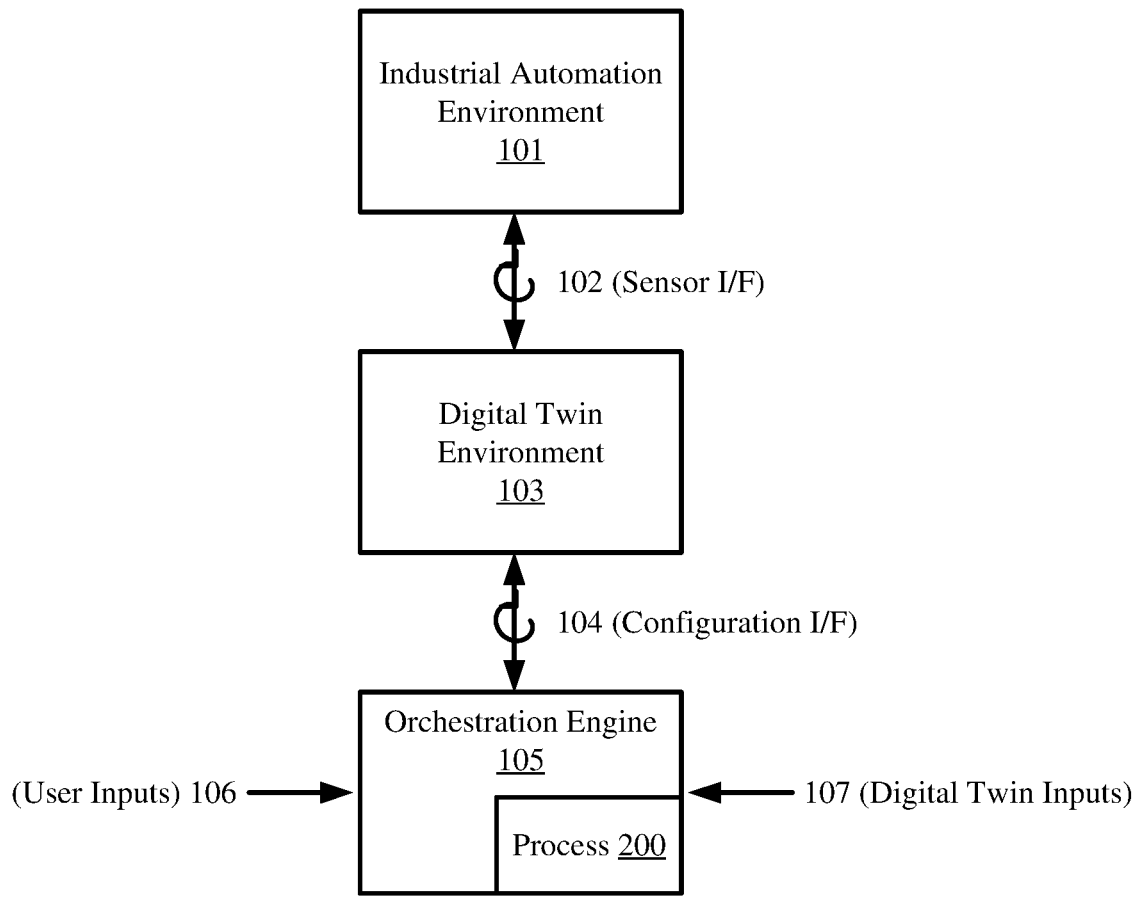
FIG. 1 illustrates an exemplary operating architecture employed to perform digital twin orchestration processes in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to digital twins of devices and assemblies. More specifically, some embodiments relate to the orchestration of digital twin models for simulating, emulating, processing, and/or representing one or more aspects of industrial systems based on characteristics of digital twins. In an instance, a method of operating an orchestration engine in an industrial automation environment. The method comprises identifying a targeted outcome for modeling the industrial automation environment, configuring a digital twin environment corresponding to the industrial automation environment based at least on the targeted outcome, wherein the digital twin environment comprises one or more digital twins, each digital twin of the one or more digital twins representative of one or more real entities of the industrial automation environment, and executing a process associated with the industrial automation environment using the digital twin environment.

In another embodiment, a computing apparatus is provided. The computing apparatus comprises one or more computer-readable storage media, a processing system operatively coupled with the one or more computer-readable storage media, and program instructions stored on the one or more computer-readable storage media that, based on being read and executed by the processing system, direct the computing apparatus to perform various functions. In such an embodiment, the program instructions direct the computing apparatus to at least identify a targeted outcome for modeling the industrial automation environment, configure a digital twin environment corresponding to the industrial automation environment based at least on the targeted outcome, wherein the digital twin environment comprises one or more digital twins, each digital twin of the one or more digital twins representative of one or more real entities of the industrial automation environment, and execute a process associated with the industrial automation environment using the digital twin environment.

In yet another embodiment, one or more computer-readable storage media have program instructions stored thereon to operate an orchestration engine in an industrial automation environment. The program instructions, when read and executed by a processing system, direct the processing system to at least identify a targeted outcome for modeling the industrial automation environment. The program instructions further direct the processing system to configure a digital twin environment corresponding to the industrial automation environment based at least on the targeted outcome and execute a process associated with the industrial automation environment using the digital twin environment.

Advantageously, an orchestration engine provided herein can at least identify, organize, and configure/tune a digital twin environment with digital twin components and interfaces to simulate, emulate, and/or represent real industrial automation entities (i.e., physical, or perceived), among other entities, according to user-defined or system-defined parameters and objectives. The digital twin environment can be used to obtain, analyze, and display data representative of actual performance of an industrial automation environment. Orchestration of such digital twin models can provide various benefits such as analyzing process and/or device efficiency, performing predictive and preventative maintenance analysis, validating design requirements of a component, subsystem, or system, and/or stress testing under various constraints.

Turning now to the Figures, FIG. 1 illustrates an exemplary operating architecture employed to perform digital twin orchestration processes in which aspects of the present technology may be implemented. Operating architecture 100 includes industrial automation environment 101, digital twin environment 103, and orchestration engine 105. Industrial automation environment 101 communicates with digital twin environment 103 via sensor interface 102. Digital twin environment 103 communicates with orchestration engine 105 via configuration interface 104. Orchestration engine 105 intakes user inputs 106 and digital twin inputs 107, wherein user inputs 106 can represent a desired system outcome or performance, and digital twin inputs 107 can represent digital twin components and associated characteristics. Orchestration engine 105 runs process 200, which can be executed on software, hardware, or some combination thereof, to configure a digital twin representation of industrial automation environment 101.

In operation, industrial automation environment 101 and digital twin environment 103 can run in parallel to operate real-time processes and virtual replications of said processes, respectively. Industrial automation environment 101 comprises one or more entities, devices, components, production lines, systems, or any combination thereof that function in a factory or warehouse, for example. Industrial automation environment 101 can include several sensors, or Internet of Things (IoT) devices, to monitor and/or tune the entities and operations. For example, the sensors can obtain data including but not limited to performance metrics, run-time, historical operation data, electrical and mechanical data, and the like. In other embodiments, sensor data can be simulated and provided to components of operating architecture 100, such as via sensor interface 102.

Digital twin environment 103 includes one or more virtual representations of the one or more entities or systems operating in industrial automation environment 101. In an ideal model, digital twin environment 103 can replicate exact performance of the devices in industrial automation environment 101. For example, a digital twin in digital twin environment 103 that represents a motor of industrial automation environment 101 may demonstrate a faithful virtual representation with respect to vibration, motor speed, electrical and mechanical output, and more. To model devices with complete fidelity requires sufficient processing power by a computing device and sensor data obtainable in industrial automation environment 101. In other embodiments, a digital twin in digital twin environment 103 may represent an entity with less than full fidelity of all characteristics and personalities. In order to obtain entity characteristics and performance data, among other things, from devices in industrial automation environment 101, digital twin environment 103 can communicate with industrial automation environment via sensor interface 102. Sensor interface 102 can comprise one or more wireless or wired connections, application programming interfaces (APIs), or other communication protocol configured to provide real-time or simulated sensor data from one or more entities of industrial automation environment 101.

Orchestration engine 105 provides automation capabilities for digital twin orchestration processes in accordance with various embodiments of the present disclosure. Orchestration engine 105 can operate on a local computing device or it can operate remotely. Orchestration engine 105 can obtain user inputs 106 and digital twin inputs 107 to coordinate and configure digital twins for use in digital twin environment 103. User inputs 106 can represent a target outcome or fidelity, performance value, and/or input/output of a digital twin. In some embodiments, user inputs 106 can be obtained via selections made by an individual using a user interface. In other embodiments, user inputs 106 can be predetermined values based on a set of entities in industrial automation environment 101. Digital twin inputs 107 can represent a selection of digital twins and related metadata obtained from a digital twin database. The digital twins can be selected automatically based on user inputs 106, or they can be selected manually from the digital twin database to meet system objectives. Metadata of the selection of digital twins can comprise characteristics, inputs/outputs, fidelity or personalities, and the like of each digital twin in the database.

In some instances, orchestration engine 105 can obtain simulation data for one or more digital twin entities corresponding to real entities based on user inputs 106 and digital twin inputs 107. In other embodiments, orchestration engine 105 receives real-time or stored sensor data via sensor interface 102. Orchestration engine 105 can use sensor data, whether simulated or real, to synchronize timing between the entities of digital twin environment 103 and/or to synchronize timing between real entities of industrial automation environment 101 with the virtual entities of digital twin environment 103. In some embodiments, visual representations of the entities within digital twin environment 103 can be used to synchronize timing with real entities of industrial automation environment 101. For example, if a digital twin can be synchronized with other digital twins of digital twin environemtn103, it may follow that a real entity (i.e., a piece of equipment) can be used effectively in industrial automation environment 101.

Upon obtaining user inputs 106 and digital twin inputs 107, orchestration engine 105 can execute process 200 (described in FIG. 2) to organize and coordinate digital twin environment 103. It may be appreciated that process 200 can be run on software, hardware, or a combination thereof. As a result, digital twin environment 103 can be populated with one or more digital twins that represent user inputs 106 and model the one or more entities or components of industrial automation environment 101. By way of example, user inputs 106 may seek a system output that faithfully represents the thermal output of a real system in order to analyze heat impact on the real entities of industrial automation environment 101. Orchestration engine 105 can obtain or configure digital twins from digital twin inputs 107 that accurately reflect thermal output and provide the digital twins to digital twin environment 103 via configuration interface 104. Configuration interface 104 can comprise one or more wireless connections, APIs, or other communication protocol. In some embodiments, orchestration engine 105 and digital twin environment 103 may reside on the same computing device.

Orchestration engine 105 provides various benefits to industrial process managers by expanding the use of IoT to analyze, visualize, and simulate industrial automation processes. For example, orchestration engine 105 can allow for customizable simulations of such processes by configuring digital twins based at least on user inputs 106. One example simulation can provide accurate representations of a system to account for mechanical strain on devices, while another exemplary simulation can display vibrational effects on a system. Another use case of digital twin simulations demonstrates predictive/preventative maintenance testing. For instance, digital twin environment 103 can use historical data of the real entities of industrial automation environment 101 to test potential issues and/or outcomes from putting further stress on the real entities after additional uses.

Figure 2:
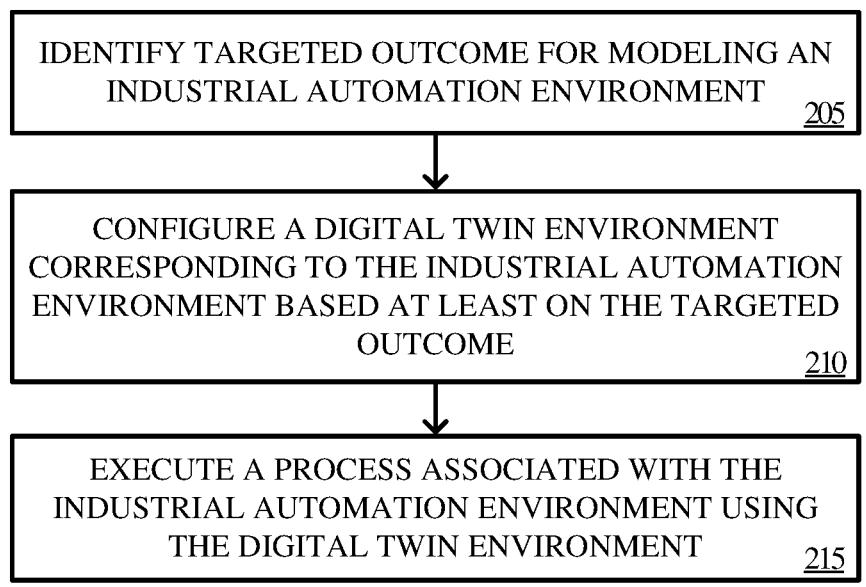
FIG. 2 illustrates a series of steps for orchestrating a digital twin model in accordance with some embodiments of the present technology.

FIG. 2 illustrates a series of steps for orchestrating a digital twin model in accordance with some embodiments of the present technology. FIG. 2 includes process 200, each operation noted parenthetically in the discussion below and which reference elements of FIG. 1. It may be appreciated that process 200 can be implemented on software, hardware, or any combination thereof. For example, process 200 can be executed on or by orchestration engine 105 of FIG. 1. Process 200 can also be executed on a computing device, such as computing device 301 of FIG. 3.

In operation 205, an orchestration engine 105 identifies (205) a targeted outcome for modeling an industrial automation environment 101. The targeted outcome can define component performance values, component characteristics, component or system output fidelity, and more. A user can select one or more outcomes via a user interface and provide them as user inputs 106 to orchestration engine 105. In other embodiments, the targeted outcome(s) can be pre-selected based on a selection of digital twins from digital twin inputs 107. For example, for repeatable or common processes, one or more targeted outcomes can be pre-configured or defined. In such instances, the targeted outcome(s) may be tuned to model industrial automation environment 101.

Next, in operation 210, orchestration engine 105 configures (210) a digital twin environment 103 corresponding to the industrial automation environment 101 based at least on the targeted outcome(s) or user inputs 106. In various embodiments, orchestration engine 105 may determine which components (i.e., motor, drive, gearbox, belt) are present in industrial automation environment 101 to select appropriate digital twins to use in digital twin environment 103. Orchestration engine 105 can then identify new digital twins or configure existing/chosen digital twins from digital twin inputs 107 that correspond to user inputs 106. For example, if user inputs 106 require a digital twin of a motor that can model electromechanical characteristics of an actual motor in industrial automation environment 101, then orchestration engine can select a digital twin faithful to electromechanical output of the actual motor for use in digital twin environment 103. Orchestration engine 105 can repeat this identification, selection, and/or tuning/configuration process for each digital twin to model the industrial automation environment 101. If, however, a digital twin of an entity in industrial automation environment 101 does not exist, orchestration engine 105 may utilize a digital twin prototype with simulation data.

Then, in operation 215, a computing device can execute (215) a process associated with the industrial automation environment 101 using the digital twin environment 103. The process associated with the industrial automation environment 101 may be a factory-line process, a mechanical process, an electromechanical process, or some combination thereof that utilizes real machinery or entities to accomplish a result in an environment. Digital twin environment 103 can be configured (210) to mimic this process by using virtual models that have the same inputs/outputs, real or simulated sensor data, and timing as the real entities. Thus, the virtual model can achieve accurate results by modeling the process in digital twin environment 103. More specifically, to model a process in digital twin environment 103, orchestration engine 105 can provide sensor data from one or more entities of industrial automation environment 101 and synchronize the data to the virtual representations of digital twin environment 103. Then, each digital twin of digital twin environment 103 can be tuned to at least the sensor data in order to targeted outcome(s). A model can provide not only real-time analytics, but also it can record historical data over iterations of simulations allowing users to perform predictive and preventative maintenance analysis on machinery in industrial automation environment 101. The computing device may display results on a user interface on the computing device or to a remote interface.

Figure 3:
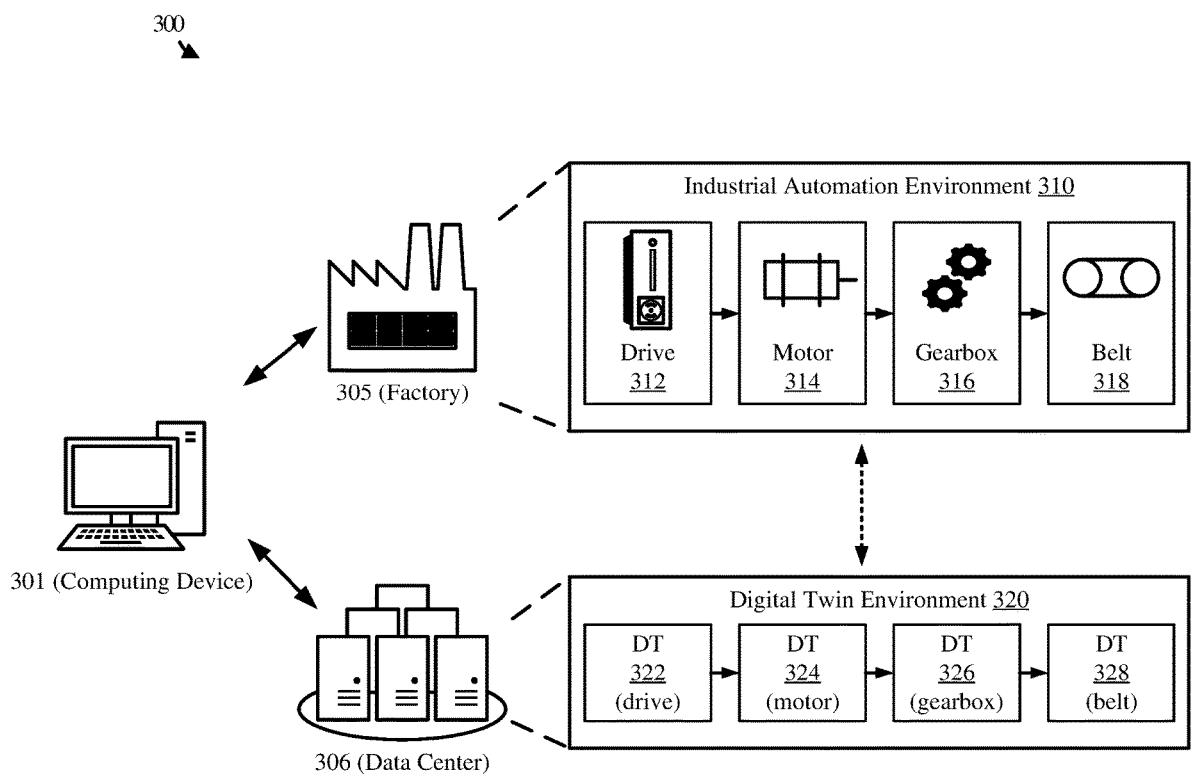
FIG. 3 illustrates an exemplary operating environment for modeling a digital twin system against an industrial automation system in accordance with some embodiments of the present technology.

FIG. 3 illustrates an exemplary operating environment for modeling a digital twin system against an industrial automation system in accordance with some embodiments of the present technology. FIG. 3 includes environment 300 which further includes computing device 301, factory 305, and data center 306. Factory 305 includes industrial automation environment 310 represented by drive 312, motor 314, gearbox 316, and belt 318, which, when functioning together, form an industrial system or operations technology elements. Data center 306 includes digital twin environment 320 which further includes representations (digital twins 322, 324, 326, and 328) of the components in industrial automation environment 310.

In operation, computing device 301 can comprise an orchestration layer to configure digital twin environment 320 to correspond to entities in industrial automation environment 310. For example, orchestration engine 105 of FIG. 1 can be implemented on computing device 301 and function across industrial automation environment 310 and digital twin environment 320. It may be appreciated that the orchestration layer may operate remotely from computing device 301. Computing device 301 may also comprise a user interface configured to provide a display of digital twin environment 320, sensor and/or simulation data, and to input target outcomes and/or performance values for digital twin modeling. Computing device 301 can communicate with both factory 305 and data center 306 via one or more APIs or other wireless or wired communications.

Factory 305 can embody an industrial plant, warehouse, factory, or the like, comprising various components that function together in the operations technology domain to perform industrial automation processes or other industrial, mechanical, and/or electromechanical processes. Industrial automation environment 310 includes a number of such components, like drive 312, motor 314, gearbox 316, and belt 318, which can function together to accomplish an industrial process. Each of the components in industrial automation environment 310 can be monitored by one or more sensors or IoT devices to obtain entity characteristics and performance metrics. These parameters can form a fidelity spectrum that can be modeled using a digital twin. Additionally, each component can be controlled by one or more controllers accessible by computing device 301 to perform operations.

On the virtual side, or information technology domain, data center 306 comprises one or more databases or computer-readable storage media devices that host digital twin environment 320 and various digital twins of actual entities. Digital twin environment 320 includes digital twins 322, 324, 326, and 328. Digital twin 322 embodies a virtual representation of drive 312, digital twin 324 embodies a virtual representation of motor 314, digital twin 326 embodies a virtual representation of gearbox 316, and digital twin 328 embodies a virtual representation of belt 318. In various instances, digital twin environment 320 includes computer-aided designs executable with simulations or emulations, and/or it is communicable with an analytic engine to derive data analytics data from one or more of the virtual representations.

In various embodiments, computing device 301 receives a user input, such as a desired outcome or performance goal of a digital twin. The desired outcome may specify a type or level of analysis sought to be achieved by executing a process using digital twin environment 320, like electromechanical performance of factory 305 equipment, for example. Computing device 301 can provide the desired outcome to data center 306, or an orchestration layer operating on either computing device 301 and/or data center 306, to begin tuning/configuring digital twin environment 320 according to the desired outcome. Data center 306 can identify and obtain the appropriate digital twins that match the components present in industrial automation environment 310 and that have characteristics to achieve the desired outcome. Data center 306 can query one or more digital twin databases to configure digital twin environment 320. In some embodiments, digital twins of the components in industrial automation environment 310 can be obtained from a third party, while other digital twins can be created against an industry standard and stored in the one or more digital twin databases of data center 306.

It may be appreciated that data center 306 and/or an orchestration layer can pre-configure, configure, or re-configure digital twin environment 320 based on a change in desired outcome. For example, computing device 301 may first request a digital twin modeling of industrial automation environment 310 that reflects electromechanical performance of the components. Accordingly, data center 306 can identify a set of digital twins whose output reflects electromechanical performance. Then, computing device 301 may update the desired outcome to one that reflects electrical efficiency. Responsive to receiving an updated outcome, data center 306 may reconfigure the existing set of digital twins by adjusting fidelity and/or performance characteristics to perform according to the updated outcome instead of identifying and selecting a new set of digital twins.

Still referring to FIG. 3, each digital twin of digital twin environment 320 can be tuned for deployment in different levels of an operations technology system (i.e., industrial automation environment 310). More specifically, a fidelity, performance characteristic, or other represented value of the digital twins can be configured for a targeted compute fabric. For example, a digital twin, such as DT 322 may be deployed to represent a lower-level model like a device or controller, thus, less complexity is required of DT 322 of digital twin environment 320. Such models may be used to generate simpler results like change detection. By way of another example, a digital twin may be deployed to represent a higher-level model like in a cloud environment, requiring increased fidelity and further sensor data and processing power. In more complex models, digital twins can be used to produce insights to drive diagnostic, descriptive, predictive, and prescriptive actions of the operations technology system. Computing device 301 can dictate an order of modeling required by digital twin environment 320 and query data center 306 for an appropriate selection accordingly.

Figure 4:
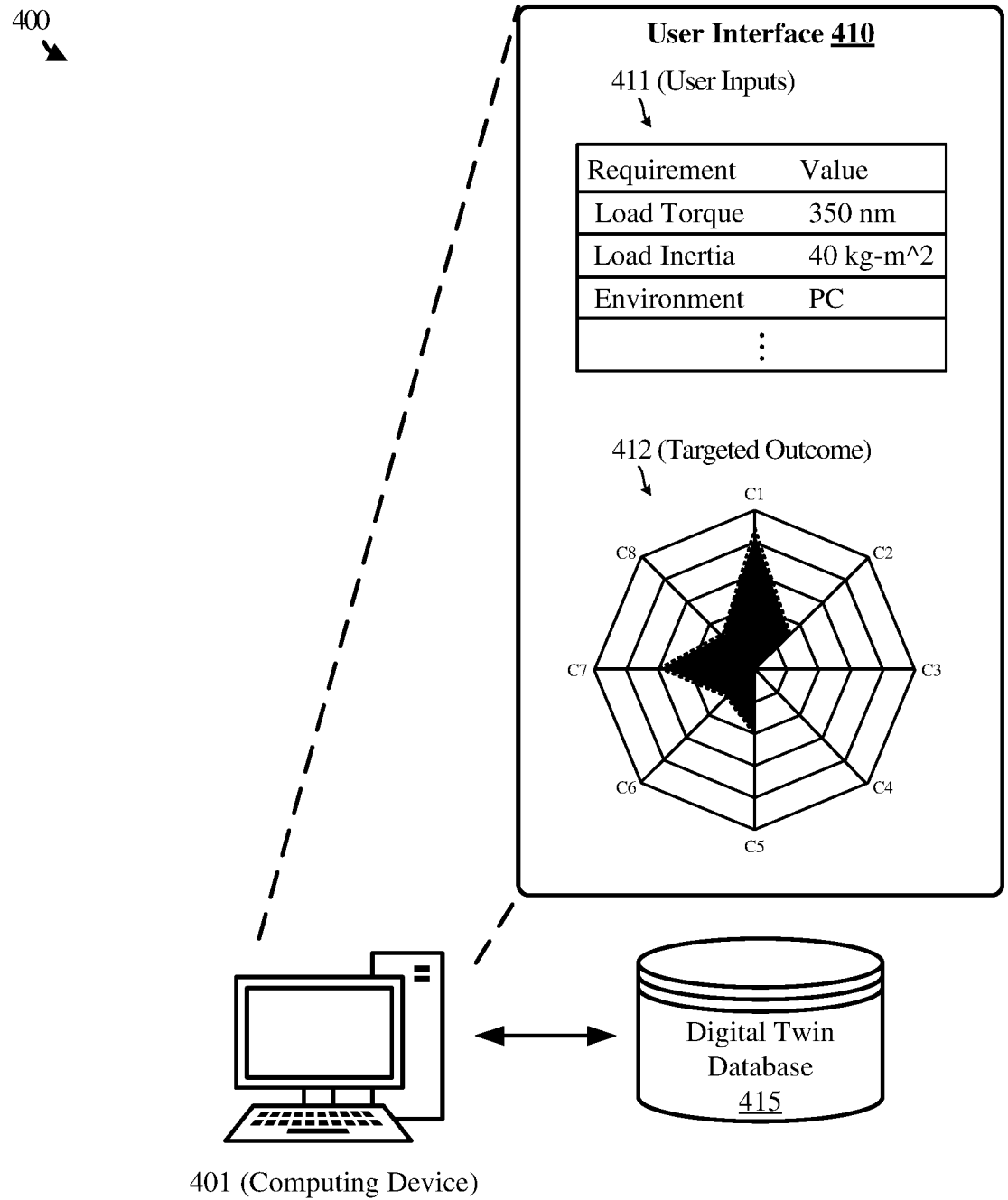
FIG. 4 illustrates an exemplary operating environment for interfacing with a digital twin environment in accordance with some embodiments of the present technology.

FIG. 4 illustrates an exemplary operating environment for interfacing with a digital twin environment in accordance with some embodiments of the present technology. FIG. 4 includes environment 400 which further includes computing device 401, user interface 410, and digital twin database 415. User interface 410 displays user inputs 411 and targeted outcome 412. Targeted outcome 412 includes a graphical representation of multi-physics personality traits pertaining to a particular outcome of a digital twin with scale to indicate fidelity thereof. The graphical representation can comprise characteristics C1-CN, which may include characteristics such as thermal, mechanical, electrical, fluid dynamics, electromagnetics, and the like. It may be appreciated that each digital twin can have one or more personality traits or characteristics, each having a defined fidelity. Fidelity can range from a first principal model (i.e., F=MA) to multi-order linear time invariant models to complex element models, or some model in between. User interface 410 can be implemented in computing device 301 of FIG. 3. User interface 410 can also provide user inputs 106 to orchestration engine 105 of FIG. 1.

In operation, computing device 401 can interface with digital twin database 415, an orchestration engine, a digital twin environment, and/or an industrial automation environment. In various embodiments, computing device 401 is a computer, tablet, phone, augmented reality device, or other computing device running software, hardware, or some combination thereof capable of communicating with such systems. The orchestration engine may run on computing device 401 or run in parallel on another server or computing device to enable control of digital twin processes. A user operating computing device 401 can interact with user interface 410 to provide user inputs 411. User inputs 411 can comprise performance requirements and values, electrical and mechanical inputs, and similar metrics that can correspond to one or more components of an industrial automation environment, such as motors, drives, gearboxes, belts, and the like. For example, a user can specify that a component or a system is required to produce 350 nm of torque. Alternatively, user inputs 411 can also provide drop-down menus, or similar selection prompts, that a user can select.

User interface 410 also provides for an interactive chart (i.e., a radar chart, spider graph, webchart) to input a targeted outcome 412. Targeted outcome 412 can represent a digital twin component or digital twin system fidelity with respect to actual performance characteristics of an industrial automation environment. To explain, a digital twin can virtually represent various characteristics or multi-physics personality traits of an actual device, such as vibration, electrical or mechanical personality, and more. Although a digital twin may be able to mimic all facets of actual devices, the processing power required by a computing device can be intense and costly, among other challenges. Thus, targeted outcome 412 can be set to virtually replicate one or more characteristics or traits of entities or systems in an industrial automation environment. As illustrated, targeted outcome 412 can be tailored to perform most closely to characteristic 1 (i.e., C1). In other embodiments, other combinations of characteristics can be set to adjust to system objectives. To set targeted outcome 412 to such a fidelity rating, a user may be able to interact (i.e., drag, select) with the chart to tune a digital twin accordingly.

As a user selects user inputs 411 and/or targeted outcome 412, computing device 401 can communicate with digital twin database 415 to identify one or more digital twins that align with the inputs of user interface 410. For example, digital twin database 415 can be queried to search and obtain one or more digital twins that correspond with targeted outcome 412 by identifying which digital twins have fidelity characteristics, or another identifier, to enable targeted outcome 412. The identified one or more digital twins can be pre-configured/configured in a digital twin environment. In some embodiments, a user can tweak user inputs 411 and/or targeted outcome 412, which may result in a different selection of digital twins for use in digital twin environment. In other embodiments, such an update via user interface 410 may result in configuration of parameters or metadata of the selected digital twins instead.

Figure 5:
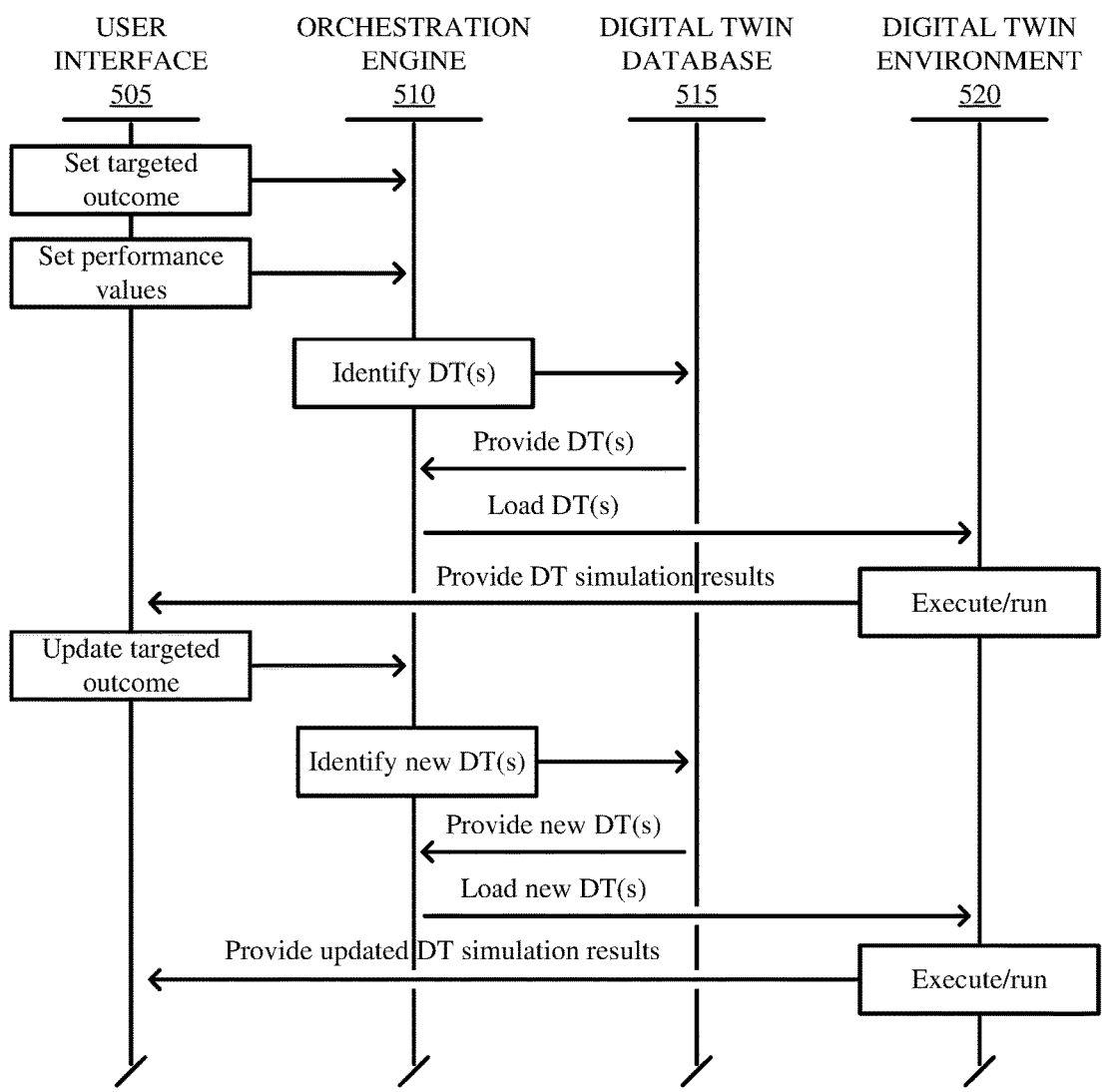
FIG. 5 is a sequence diagram illustrating data flow between various components of a digital twin orchestration system in accordance with some embodiments of the present technology.

FIG. 5 is a sequence diagram illustrating data flow between various components of a digital twin orchestration system in accordance with some embodiments of the present technology. FIG. 5 includes environment 500 wherein data flow is communicated between user interface 505, orchestration engine 510, digital twin database 515, and digital twin environment 520.

To begin, user interface 505 can set a targeted outcome and performance values to meet system objectives. Such user inputs can refer to requirements, electrically, thermally, mechanically, and the like, that a digital twin must abide to represent a real entity or system in an industrial automation environment. The targeted outcome can refer to a single digital twin fidelity with respect to a real entity, or it can refer to a whole digital twin environment 520 fidelity with respect to a real system, or some combination thereof. User interface 505 can operate on a computing device, such as computing device 401 of FIG. 4. User interface 505 communicates the targeted outcome and performance values to orchestration engine 510 via a communication protocol, such as an API.

Orchestration engine 510 can run on a computing device operating user interface 505, or it can be operated in a separate environment. Orchestration engine 510 obtains user inputs from user interface 505 and identifies one or more digital twins according to the user inputs. Orchestration engine 510 communicates with digital twin database 515 via a communication link. Digital twin database 515 can be a local database, remote database, or a data center, such as data center 306 of FIG. 3, comprising a list or catalog of digital twins and metadata associated with each digital twin, such as digital twin type, model, fidelity, and the like. Orchestration engine 505 receives the one or more digital twins from digital twin database 515 and loads the digital twins to digital twin environment 520 in a configuration corresponding to an industrial automation environment.

Digital twin environment 520 comprises one or more identified digital twins configured according to an industrial automation environment. For example, industrial automation environment may include a conveyer belt assembly comprising a drive, motor, gearbox, and belt, among other devices. Digital twin environment 520 can include digital twins representing each aforementioned device configured in the same order. Configuring the digital twins can comprise setting parameters to match the user inputs of user interface 505, arranging an order of the digital twins, and/or aligning inputs and outputs from one digital twin to another digital twin. Once the digital twin environment 520 aligns with the industrial automation environment, a model can be run to represent, simulate, or emulate an output of an automation process using the digital twins. The results can be provided to at least user interface 505 for display to a user.

In this embodiment, a user can update the targeted outcome using user interface 505 after obtaining results. As a result of updating the targeted outcome, orchestration engine 510 can receive updated parameters and identify one or more new digital twins to utilize. Digital twin database 515 can provide the newly identified digital twins, and orchestration engine 510 can load the new digital twin(s) in digital twin environment 520. Digital twin environment 520 can then execute the same or another process and provide the updated results to user interface 505.

It may be appreciated by one skilled in the art that digital twin environment 520 can continuously provide model results using the one or more digital twins. During the continuous operation of a digital twin system, one or more digital twins can be swapped in/out and/or re-configured to determine a performance of digital twin environment 520. Further, the targeted outcome can be updated throughout the process via user interface 505 which can trigger automatic updates to digital twin environment 520 by orchestration engine 510.

Figure 6:
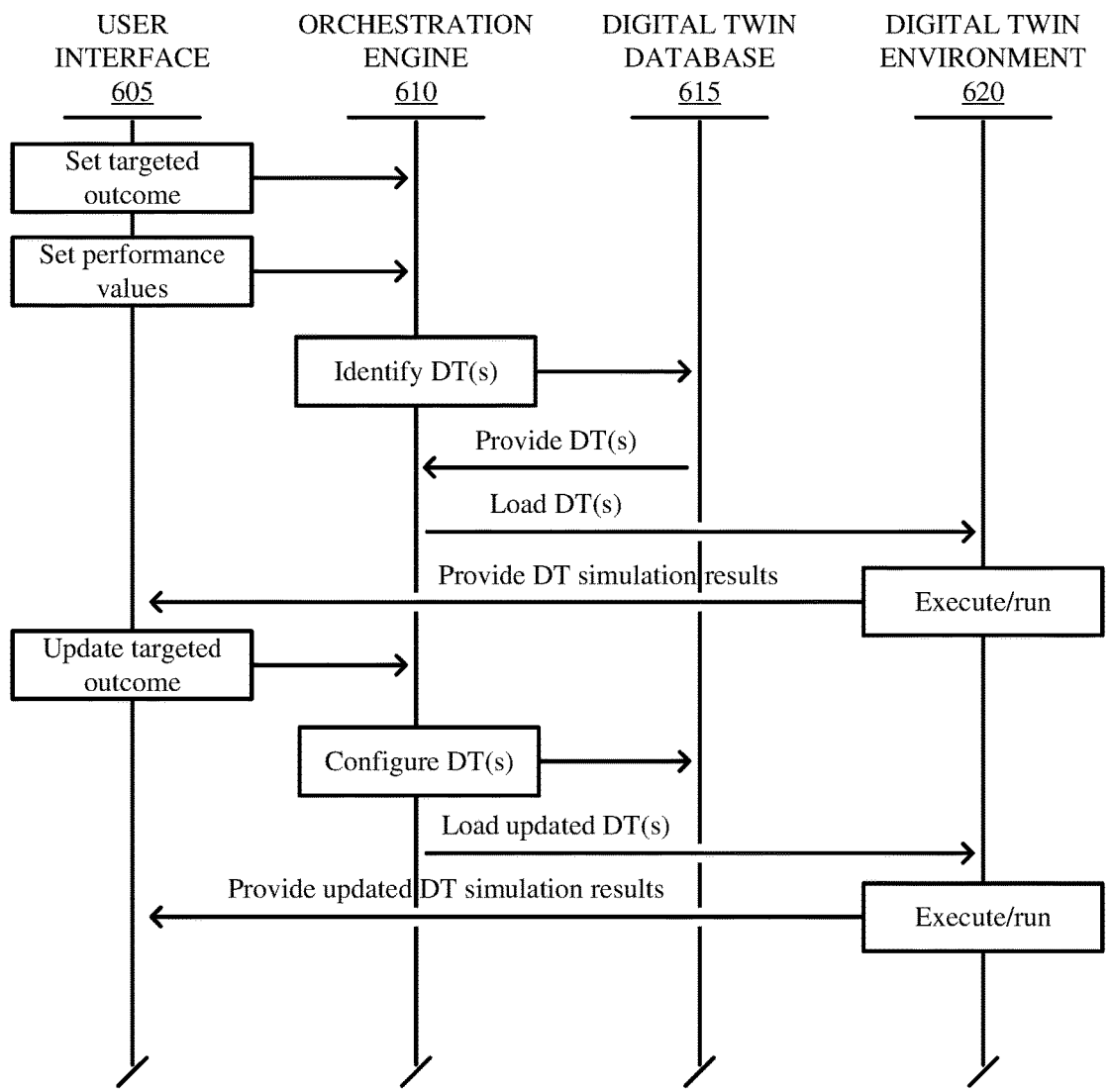
FIG. 6 is a sequence diagram illustrating data flow between various components of a digital twin orchestration system in accordance with some embodiments of the present technology.

FIG. 6 is a sequence diagram illustrating data flow between various components of a digital twin orchestration system in accordance with some embodiments of the present technology. FIG. 6 includes environment 600 wherein data flow is communicated between user interface 605, orchestration 610, digital twin database 615, and digital twin environment 620.

To begin, user interface 605 can set a targeted outcome and performance values or multi-physics personality traits to meet system objectives. Such user inputs can refer to requirements, electrically, thermally, mechanically, and the like, that a digital twin must abide by to represent a real device or system in an industrial automation environment. The targeted outcome can refer to a single digital twin fidelity with respect to a real entity, or it can refer to a whole digital twin environment 620 fidelity with respect to a real system, or some combination thereof. User interface 605 can operate on a computing device, such as computing device 401 of FIG. 4. User interface 605 communicates the targeted outcome and performance values to orchestration engine 610 via a communication protocol, such as an API.

Orchestration engine 610 can run on a computing device operating user interface 605, or it can be operated in a separate environment. Orchestration engine 610 obtains user inputs from user interface 605 and identifies one or more digital twins according to the user inputs. Orchestration engine 610 communicates with digital twin database 615 via a communication link. Digital twin database 615 can be a local database, remote database, or a data center, such as data center 306 of FIG. 3, comprising a list or catalog of digital twins and metadata associated with each digital twin, such as digital twin type, model, fidelity, and the like. Orchestration engine 605 receives the one or more digital twins from digital twin database 615 and loads the digital twins to digital twin environment 620 in a configuration corresponding to an industrial automation environment.

Digital twin environment 620 comprises the one or more identified digital twins configured according to an industrial automation environment. For example, industrial automation environment may include a conveyer belt assembly comprising a drive, motor, gearbox, and belt, among other devices. Digital twin environment 620 can include digital twins representing each aforementioned device configured in the same order. Configuring the digital twins can comprise setting parameters to match the user inputs of user interface 605, arranging an order of the digital twins, and/or aligning inputs and outputs from one digital twin to another digital twin. Once the digital twin environment 620 aligns with the industrial automation environment, a simulation, emulation, or the like can be run to model an output of the digital twins. The results from each digital twin can be coordinated or synchronized and provided to at least user interface 605 for display to a user. Further, in some embodiments, visual representations of the digital twins can be modeled to demonstrate performance (i.e., physical and/or statistical) of entities in the industrial automation environment.

In this embodiment, a user can update the targeted outcome using user interface 605 after obtaining results. As a result, orchestration engine 610 can receive updated parameters and re-configure the previously loaded digital twins. In response to the configuration, digital twin database 615 can update a record or table of the identified digital twins. Then, orchestration engine 610 can load the updated digital twin(s) in digital twin environment 620. Digital twin environment 620 can then execute another representation to provide the updated results to user interface 605. In other embodiments, digital twin environment 620 can execute a simulation and/or emulation, for example, to provide the updated results. Further, digital twin environment 620 can pull data, via IoT, from one or more physical entities.

It may be appreciated by one skilled in the art that digital twin environment 620 can continuously provide model results using the one or more digital twins. During the continuous operation of a digital twin system, one or more digital twins can be swapped in/out or re-configured to determine a performance of digital twin environment 620. Further, the targeted outcome can be updated throughout the process via user interface 605 which can trigger automatic updates to digital twin environment 620 by orchestration engine 610.

Figure 7:
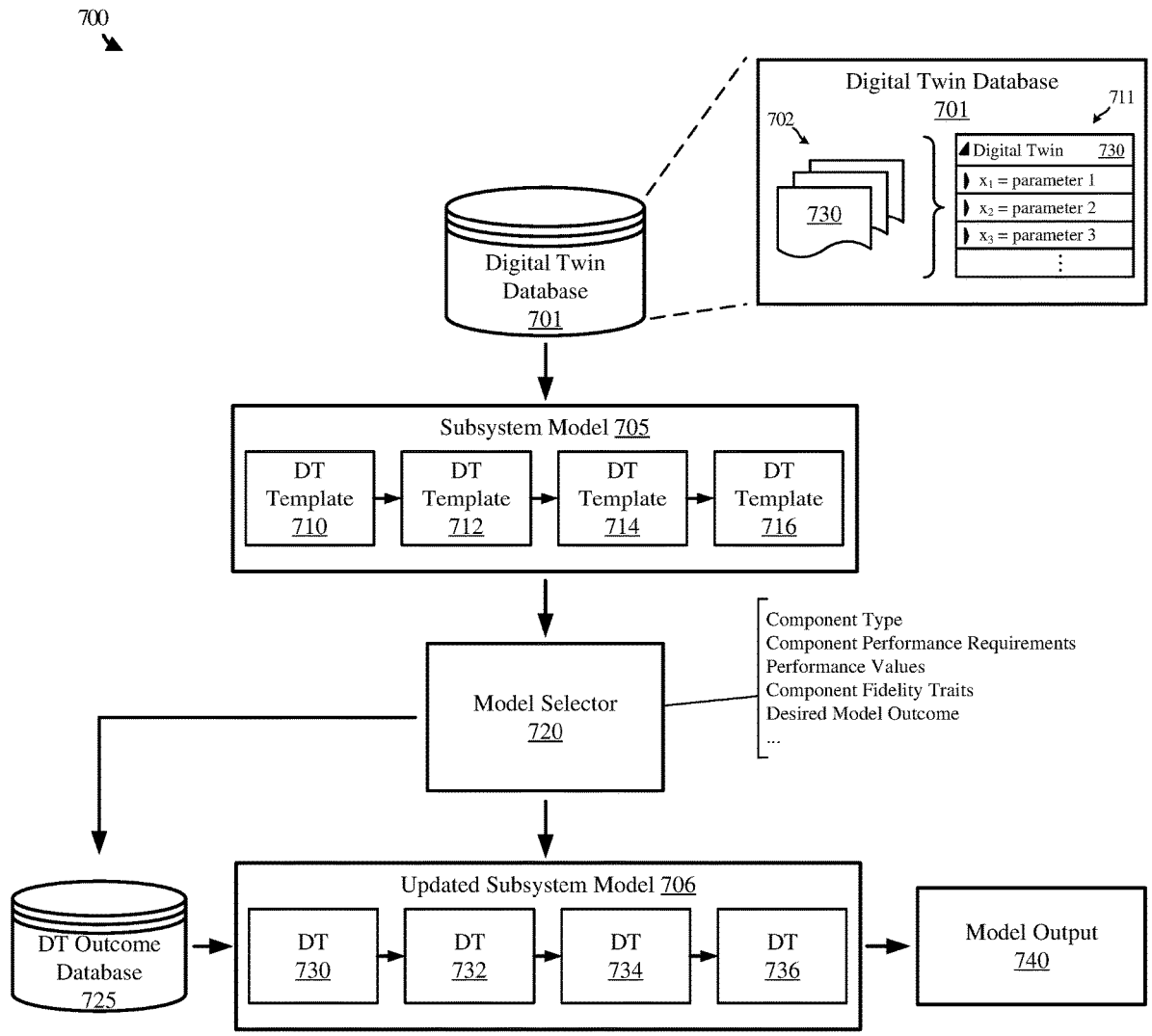
FIG. 7 illustrates an exemplary operating architecture for configuring a digital twin environment in accordance with some embodiments of the present technology.

FIG. 7 illustrates an exemplary operating architecture for configuring a digital twin environment in accordance with some embodiments of the present technology. FIG. 7 includes architecture 700, which further includes digital twin database 701, subsystem model 705, updated subsystem model 706, model selector 720, digital twin outcome database 725, and model output 740. Digital twin database 701 comprises digital twin index 702 and digital twin parameters 711. Subsystem model 705 comprises digital twin templates 710, 712, 714, and 716, which may represent generic virtual models of industrial components. Updated subsystem model 706 comprises digital twins 730, 732, 734, and 736, each of which include parameters required to provide model output 740.

In operation, a digital twin database 701 comprises a catalog of digital twins and can be queried to create a subsystem of digital twins capable of providing a model output 740 that represents a subsystem of real entities operating in an industrial environment. Digital twin database 701 comprises digital twin index 702 and digital twin parameters 711. Digital twin index 702 can include one digital twin per real entity or it can include multiple digital twins per real entity, each linked by an identifier or some other way. In embodiments wherein multiple digital twins are included per real entity, each digital twin can be configured to represent a different trait of the real entity. Digital twin parameters 711 can include information about each digital twin in digital twin index 702, such as digital twin name, a corresponding real entity, digital twin fidelity characteristics or traits, and other metadata stored in tables or a similar fashion.

An orchestration engine can communicate with digital twin database 701 to search, identify, and obtain digital twin components to form subsystem model 705. Subsystem model 705 can include a number of digital twin components, such as digital twin templates 710, 712, 714, and 716, that each represent a real entity used as part of an industrial automation process. The digital twin templates may have parameters associated with them, though, in some embodiments, they may only identify a type of digital twin used to represent the real entity. Each digital twin template can be selected from digital twin database 701 manually by a user via a user interface, or it can be imported automatically based at least on a desired outcome and/or fidelity characteristics required of the digital twin. It may be appreciated that subsystem model 705 can be created in a programming environment or design studio, such as Studio 5000.

Model selector 720 can provide a selection tool for a user to identify a goal for the digital twin environment formed as subsystem model 705, wherein subsystem model 705 can be configured to perform according to the goal. For example, a user can select a component type, component performance requirements, performance values, component fidelity traits, a desired model outcome, and the like. In various embodiments, model selector 720 is a user interface operating on a computing device in communication with one or more databases and an orchestration engine.

Based on the selections provided to model selector 720, an updated subsystem model 706 can be orchestrated and configured with digital twins 730, 732, 734, and 736 from digital twin database 701 and/or digital twin outcome database 725. In an embodiment, digital twin outcome database 725 can comprise identifiers or an index (i.e., digital twin index 702) to reference the digital twins or templates located in digital twin database 701. Model selector 720 can provide information to digital twin outcome database 725 such as digital twin names, types, and/or parameters from subsystem model 705 and the selection or outcome chosen, among other details. Then, digital twin outcome database 725 can identify each of digital twin templates 710, 712, 714, and 716, populate or configure/re-configure them with parameters, fidelity characteristics, and the like, and create updated subsystem model 706 with digital twins (i.e., digital twins 730, 732, 734, 736) configured to represent industrial automation entities according to the selection or outcome.

Moreover, model selector 720 can communicate with digital twin outcome database 725 to identify digital twins usable based on the outcome and values selected. Digital twin database 725 may identify one or more digital twins that can be utilized in updated subsystem model 706. In some instances, a user can choose which digital twin to use; in other instances, a best-fit digital twin can be selected automatically. Digital twin outcome database 725 can also provide the required interfaces (i.e., APIs) for each of digital twins 730, 732, 734, and 736 to perform according to the selections made at model selector 720. Further, each of digital twins 730, 732, 734, and 736 can be coordinated or synchronized to align proper timing to mimic an industrial automation entity. Each digital twin of updated subsystem model 706 can provide its output as an input to the next digital twin via an API so the subsystem can perform like its real counterpart. For example, digital twin 732 can receive an input from digital twin 730, create an output, and provide its output to digital twin 734 to run synchronously, and so on.

In some embodiments, updated subsystem model 706 can be displayed on a user interface to allow for further configuration, fine tuning, and/or synchronization of the digital twin parameters. Subsequently, updated subsystem model 706 can be executed to coordinate the industrial process(es) and produce model output 740. Further, model output 740 can be uploaded and saved to digital twin outcome database 725 and/or digital twin database 701 for later use.

It may be appreciated that in another embodiment, only one of digital twin database 701 and digital twin outcome database 725 may exist, or they may functionally be the same database. As such, model selector 720 may query the database to populate and create the subsystem models at one or more points during the subsystem model creation process described within the context of architecture 700 or other Figures to produce representations of an industrial automation environment.

Figure 8A:
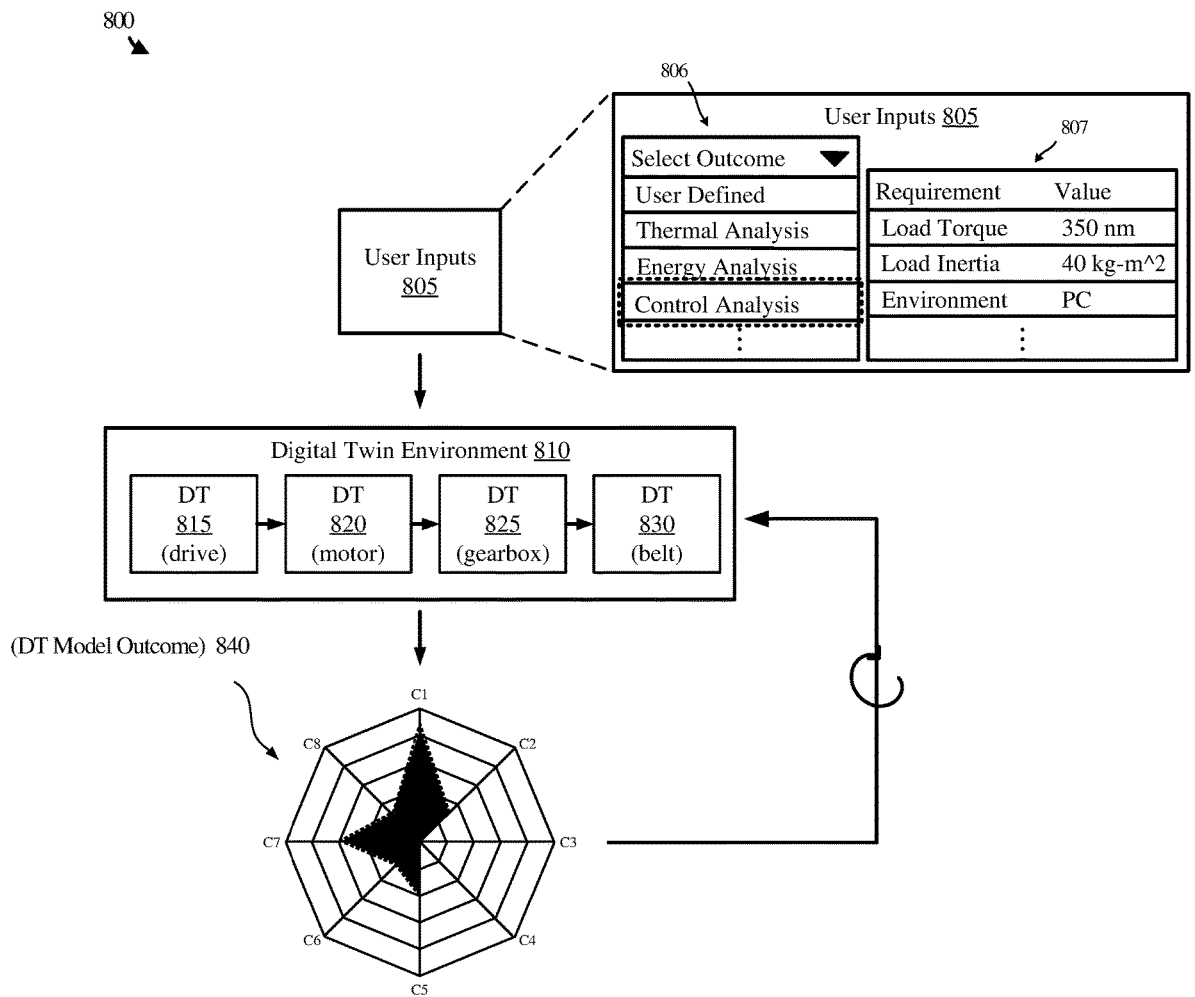
FIGS. 8A, 8B, and 8C illustrate exemplary interfaces that may be utilized to configure digital twin environments in accordance with some embodiments of the present technology.
Figure 8B:
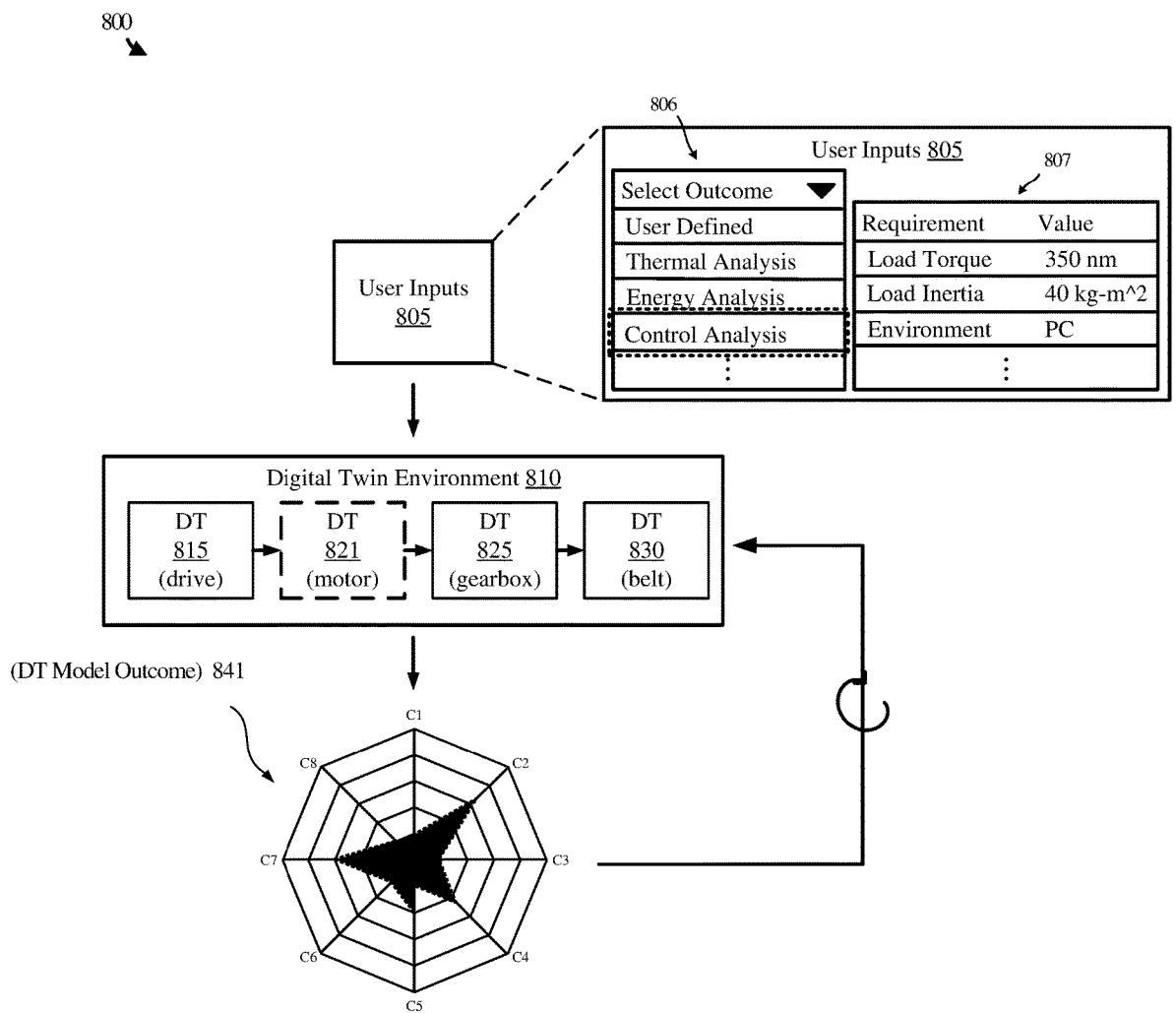
Figure 8C:
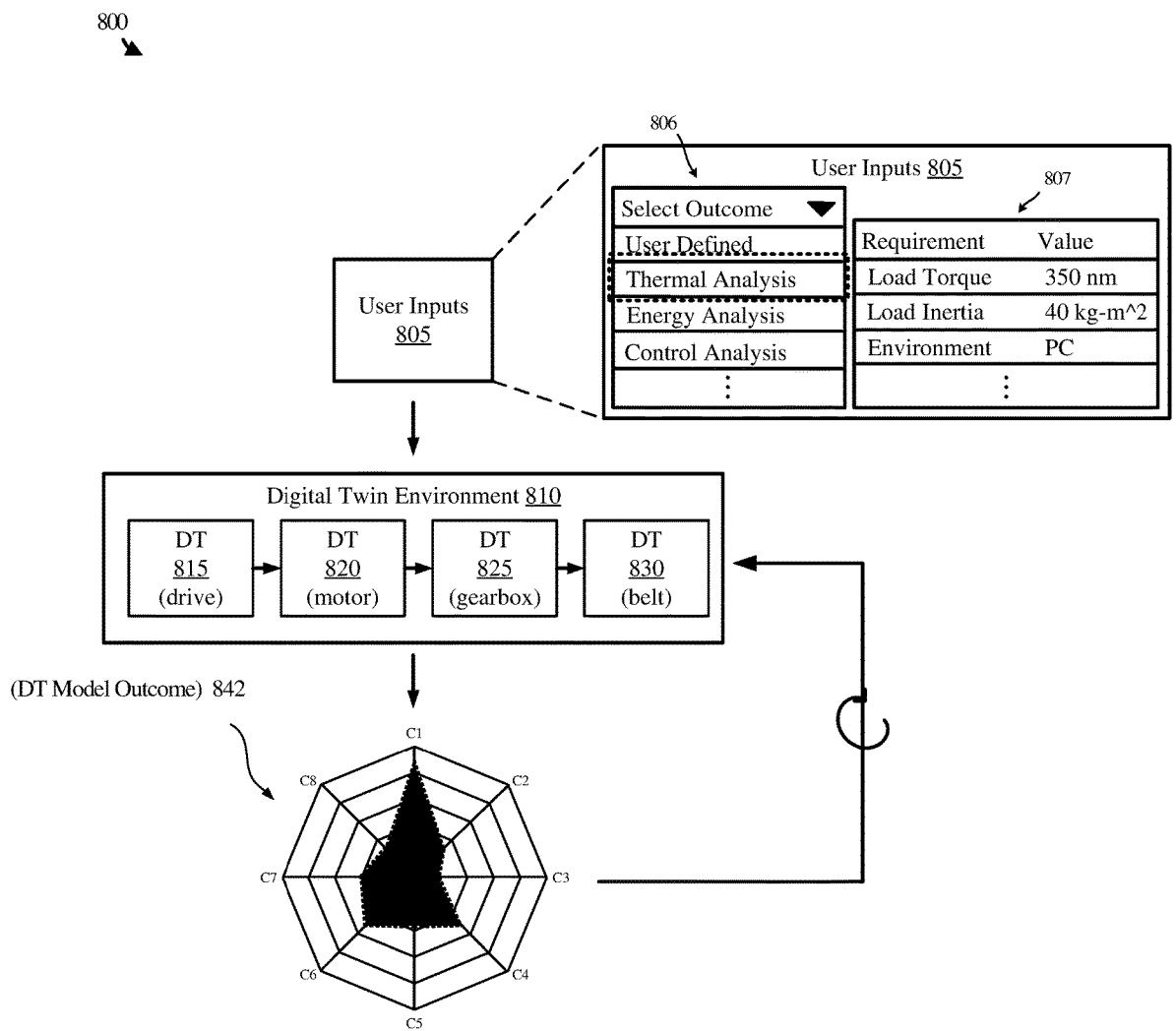

FIGS. 8A, 8B, and 8C illustrate exemplary interfaces that may be utilized to configure and interact with digital twin environments in accordance with some embodiments of the present technology. FIG. 8A includes environment 800, which further includes user inputs 805, digital twin environment 810, and digital twin model outcome 840. User inputs 805 comprises outcome selection 806 and parameters 807. Digital twin environment 810 comprises digital twins 815, 820, 825, and 830. Digital twin model outcome 840 includes a graphical representation of multi-physics personality traits pertaining to a particular outcome of a digital twin with scale to indicate fidelity thereof. The graphical representation can comprise characteristics C1-C8, or any number of characteristics, and demonstrates values pertaining to those characteristics.

In operation, user inputs 805 can be selected by a user via a user interface. A user can select a targeted outcome(s) from outcome selection 806, such as user-defined, thermal analysis, energy analysis, control analysis, and more. It may be appreciated that a user can select one or more than one targeted outcome. These selections can represent a goal of a digital twin system as it models a performance of an industrial process, for example. Accordingly, a control analysis selection, as shown in FIG. 8A, can influence the selection of digital twins towards digital twins that best represent control aspects and/or characteristics of real entities. Further, the user can enter or select parameters 807 to define the operations of the digital twins.

Digital twin environment 810 represents a virtual environment that embodies a real industrial environment. As such, digital twin 815 is a digital representation of a drive, digital twin 820 is a digital twin of a motor, digital twin 825 is a digital twin of a gearbox, and digital twin 830 is a digital twin of a belt. Each digital twin can be connected and communicate via one or more interfaces, such as an API, to provide inputs/outputs to one another and synchronize to a time unit to allow digital twin environment 810 to be coordinated with real entities. The digital twins in digital twin environment 810 can be identified in a database and selected from the database by an orchestration engine or a user according to user inputs 805. The digital twins can comprise personality traits or fidelity characteristics, performance values, and/or other metadata indicating what is capable of being represented by the digital twins. For example, one digital twin may have a personality trait indicating electrical fidelity, while another may have both electrical fidelity and mechanical fidelity, or some other combination of traits. Thus, as user inputs 805 change, the digital twins can be pre-configured, configured, and/or pre-configured or switched out for different representations. The digital twins can be searched and selected from the database by a number of identifiers, such as fidelity characteristics, type, performance values, and the like. As such, the database can comprise a catalog of the digital twins and corresponding identifiers.

By running digital twin environment 810, digital twin model outcome 840 can be produced to demonstrate the overall system performance. In other embodiments, an outcome like digital twin model outcome 840 can be provided for each digital twin of digital twin environment 810. Digital twin model outcome 840 shows that characteristics 1, 5, and 7 (i.e., C1, C5, and C7) are the most heavily reflected based at least on user inputs 805 and the model selected in digital twin environment 810. In various embodiments, each digital twin (i.e., 815, 820, 825, and 830) of digital twin environment 810 can be configured/re-configured to produce a different digital twin model outcome 840.

It may be appreciated that user inputs 805, among other features, can be presented and selected in various ways. For instance, in an embodiment, user inputs 805 may be represented by a spider chart, such as digital twin model outcome 840, wherein each desired characteristic can be selected upfront to determine the configuration parameters of digital twin environment 810. As such, the database can be queried to find one or more digital twins with characteristics or fidelity values for enabling an outcome represented by user inputs 805. It may be further appreciated that not each digital twin may have characteristics corresponding to the outcome. However, the combination of each digital twin in digital twin environment 810 may ultimately lead to the representation of that outcome. Additionally, more than one digital twin may be available for use in the database. In those instances, a user, computing device, orchestration layer, or the like can select an appropriate digital twin to use in digital twin environment 810.

FIG. 8B illustrates a digital twin model outcome 841 with different values for each characteristic based on a change in digital twin selection and/or a modification of digital twin outcome 841. As a result, an updated selection/configuration of digital twins is provided in digital twin environment 810. Digital twin environment 810 now includes digital twins 815, 821, 825, and 830. Digital twin 821, like digital twin 820, also represents a motor, however, it may produce a unique output or have varied multi-physics personality traits from digital twin 820 used in FIG. 8A. Thus, the replacement of digital twin 821 can alter the model outcome and produce results wherein characteristics 2, 4, and 7 (i.e., C2, C4, and C7) dominate the fidelity traits modeled.

In various instances, digital twin model outcome 841 can be modified prior to or subsequent to configuring/re-configuring digital twin environment 810. For example, a user can tweak digital twin model outcome 841 to produce a different outcome in addition to or in place of a change in user inputs 805. As a result, the database can be queried to obtain one or more digital twins, or some combination of digital twins, capable of representing the updated outcome. Alternatively, the digital twins initially selected for use in digital twin environment 810 can be re-configured according to digital twin model outcome 841 and/or user inputs 805.

FIG. 8C illustrates a digital twin model outcome 842 that has changed based on a different selection of user inputs 805 and/or a modification to digital twin outcome 842. For example, outcome selection 806 now identifies thermal analysis as the model goal, and as a result, digital twin model outcome 842 can reflect fidelity values corresponding to thermal analysis. In may be appreciated that in some instances, digital twin model outcome 842 can changed instead resulting in a different outcome selection 806.

User inputs 805, among other factors, can influence the selection of digital twins used in digital twin environment 810. In other embodiments, user inputs 805 can affect the characteristics of digital twins of digital twin environment 810. Upon a change in selection of user inputs 805, the database can be queried with a request to obtain other digital twins or another combination of digital twins capable of representing the desired outcome. Alternatively, one or more of the digital twins can be re-configured to produce the desired outcome. In the instance illustrated by FIG. 8C, by updating user inputs 805, digital twin model outcome 842 produces a simulation of entities faithful to characteristics C1, C4, C5, and C6.

Figure 9:
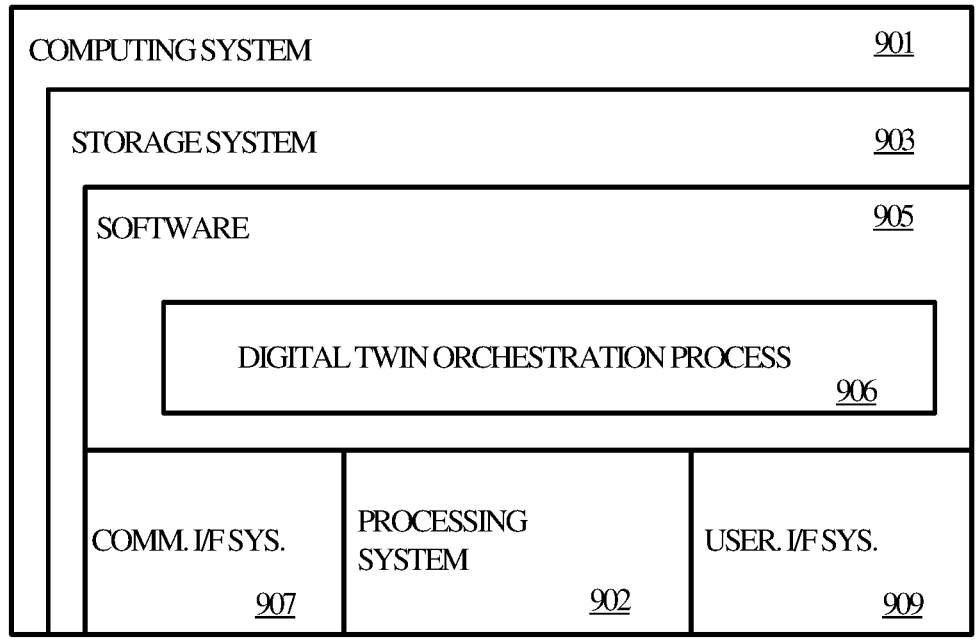
FIG. 9 illustrates a computing device that may be used in accordance with some embodiments of the present technology.

FIG. 9 illustrates computing system 901 to perform digital twin orchestration according to an implementation of the present technology. Computing system 901 is representative of any system or collection of systems with which the various operational architectures, processes, scenarios, and sequences disclosed herein for digital twin orchestration may be employed. Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909 (optional). Processing system 902 is operatively coupled with storage system 903, communication interface system 907, and user interface system 909. Computing system 901 may be representative of a cloud computing device, distributed computing device, or the like.

Processing system 902 loads and executes software 905 from storage system 903. Software 905 includes and implements digital twin orchestration process 906, which is representative of any of the digital twin orchestration processes discussed with respect to the preceding Figures. When executed by processing system 902 to provide digital twin orchestration functions, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including digital twin orchestration process 906) may be implemented in program instructions and among other functions may, when executed by processing system 902, direct processing system 902 to operate as described with respect to the various operational scenarios, sequences, and processes illustrated herein. For example, software 905 may include program instructions for implementing an orchestration engine for digital twin systems as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to provide digital twin orchestration as described herein. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of an orchestration engine, it should be understood that the digital twin orchestration systems and methods described herein are not limited to such embodiments and may apply to a variety of other digital twin environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an orchestration engine in an industrial automation environment, the method comprising:
   identifying a targeted outcome for modeling the industrial automation environment;
   configuring a digital twin environment corresponding to the industrial automation environment based at least on the targeted outcome, wherein the digital twin environment comprises two or more digital twins, each digital twin of the two or more digital twins representative of one or more real entities of the industrial automation environment;
   synchronizing each digital twin of the two or more digital twins with each other based on sensor data from the one or more real entities to mimic a timing of the industrial automation environment and tuning the two or more digital twins to achieve the targeted outcome in the digital twin environment; and
   executing a process associated with the industrial automation environment using the digital twin environment.

2. The method of claim 1, further comprising providing a digital twin representation of the process associated with the industrial automation environment to a user interface.

3. The method of claim 1, wherein tuning the two or more digital twins to achieve the targeted outcome comprises tuning each digital twin of the two or more digital twins using sensor data from corresponding ones of the one or more real entities to achieve the targeted outcome in the digital twin environment.

4. The method of claim 1, wherein the targeted outcome comprises one or more of:
   a performance fidelity of each digital twin of the two or more digital twins with respect to an actual performance of each real entity of the one or more real entities, and
   a performance fidelity of the digital twin environment with respect to an actual performance of the industrial automation environment.

5. The method of claim 1, wherein configuring the digital twin environment comprises searching a database of digital twins for digital twins having fidelity characteristics corresponding to the targeted outcome, wherein the database comprises a catalog of digital twins identified by at least their respective fidelity characteristics.

6. The method of claim 1, further comprising retuning the digital twin environment based at least on the execution of the process and the sensor data from the one or more real entities of the industrial automation environment.

7. The method of claim 6, wherein retuning the digital twin environment comprises modifying an operation of each digital twin of the two or more digital twins to perform according to the targeted outcome.

8. A computing apparatus, comprising:
one or more non-transitory computer-readable storage media;
a processing system operatively coupled with the one or more non-transitory computer-readable storage media; and
program instructions stored on the one or more non-transitory computer-readable storage media that, based on being read and executed by the processing system, direct the computing apparatus to at least:
identify a targeted outcome for modeling an industrial automation environment;
configure a digital twin environment corresponding to the industrial automation environment based at least on the targeted outcome, wherein the digital twin environment comprises two or more digital twins, each digital twin of the two or more digital twins representative of one or more real entities of the industrial automation environment;
synchronize each digital twin of the two or more digital twins with each other based on sensor data from the one or more real entities to mimic a timing of the industrial automation environment and tune the two or more digital twins to achieve the targeted outcome in the digital twin environment; and
execute a process associated with the industrial automation environment using the digital twin environment.

9. The computing apparatus of claim 8, wherein the program instructions further direct the computing apparatus to provide a digital twin representation of the process associated with the industrial automation environment to a user interface.

10. The computing apparatus of claim 8, wherein the program instructions further direct the computing apparatus to tune each digital twin of the two or more digital twins using sensor data from corresponding ones of the one or more real entities to achieve the targeted outcome in the digital twin environment.

11. The computing apparatus of claim 8, wherein the targeted outcome comprises one or more of:
a performance fidelity of each digital twin of the two or more digital twins with respect to an actual performance of each real entity of the one or more real entities, and
a performance fidelity of the digital twin environment with respect to an actual performance of the industrial automation environment.

12. The computing apparatus of claim 8, wherein to configure the digital twin environment, the program instructions direct the computing apparatus to search a database of digital twins for digital twins having fidelity characteristics corresponding to the targeted outcome, wherein the database comprises a catalog of digital twins identified by at least their respective fidelity characteristics.

13. The computing apparatus of claim 8, wherein the program instructions further direct the computing apparatus to retune the digital twin environment based at least on the execution of the process and the sensor data from the one or more real entities of the industrial automation environment.

14. The computing apparatus of claim 13, wherein to retune the digital twin environment, the program instructions further direct the computing apparatus to modify an operation of each digital twin of the two or more digital twins to perform according to the targeted outcome.

15. One or more non-transitory computer-readable storage media having program instructions stored thereon to operate an orchestration engine in an industrial automation environment, wherein the program instructions, when read and executed by a processing system, direct the processing system to at least:
identify a targeted outcome for modeling the industrial automation environment;
configure a digital twin environment corresponding to the industrial automation environment based at least on the targeted outcome, wherein the digital twin environment comprises two or more digital twins, each digital twin of the two or more digital twins representative of one or more real entities of the industrial automation environment;
synchronize each digital twin of the two or more digital twins with each other based on sensor data from the one or more real entities to mimic a timing of the industrial automation environment and tune the two or more digital twins to achieve the targeted outcome in the digital twin environment; and
execute a process associated with the industrial automation environment using the digital twin environment.

16. The one or more non-transitory computer-readable storage media of claim 15, wherein the program instructions further direct the processing system to tune each digital twin of the two or more digital twins using sensor data from corresponding ones of the one or more real entities to achieve the targeted outcome in the digital twin environment.

17. The one or more non-transitory computer-readable storage media of claim 15, wherein the targeted outcome comprises one or more of:
a performance fidelity of each digital twin of the two or more digital twins with respect to an actual performance of each real entity of the one or more real entities, and
a performance fidelity of the digital twin environment with respect to an actual performance of the industrial automation environment.

18. The one or more non-transitory computer-readable storage media of claim 15, wherein to configure the digital twin environment, the program instructions further direct the processing system to search a database of digital twins for digital twins having fidelity characteristics corresponding the targeted outcome, wherein the database comprises a catalog of digital twins identified by at least their respective fidelity characteristics.

19. The one or more non-transitory computer-readable storage media of claim 15, wherein the program instructions further direct the processing system to retune the digital twin environment based at least on the execution of the process and the sensor data from the one or more real entities of the industrial automation environment.

20. The one or more non-transitory computer-readable storage media of claim 19, wherein to retune the digital twin environment, the program instructions further direct the processing system to modify an operation of each digital twin of the two or more digital twins to perform according to the targeted outcome.

* * * * *